United States Patent
Gustafsson et al.

(10) Patent No.: US 6,701,429 B1
(45) Date of Patent: Mar. 2, 2004

(54) SYSTEM AND METHOD OF START-UP IN EFFICIENT WAY FOR MULTI-PROCESSOR SYSTEMS BASED ON RETURNED IDENTIFICATION INFORMATION READ FROM PRE-DETERMINED MEMORY LOCATION

(75) Inventors: Peter Gustafsson, Lund (SE); Fredrik Wendel, Flyinge (SE)

(73) Assignee: Telefonaktiebolaget LM Ericsson(Publ), Stockholm (SE)

( * ) Notice: Subject to any disclaimer, the term of this patent is extended or adjusted under 35 U.S.C. 154(b) by 0 days.

(21) Appl. No.: 09/447,089

(22) Filed: Nov. 22, 1999

Related U.S. Application Data
(60) Provisional application No. 60/110,985, filed on Dec. 3, 1998.

(51) Int. Cl.[7] ............................................. G06F 15/177

(52) U.S. Cl. .................. 713/1; 713/1; 713/2; 713/400; 710/200

(58) Field of Search ............................... 713/1, 400, 2; 710/200

(56) References Cited

U.S. PATENT DOCUMENTS

| | | | |
|---|---|---|---|
| 4,181,940 A | * 1/1980 | Underwood et al. | 364/200 |
| 4,268,904 A | 5/1981 | Suzuki et al. | 364/200 |
| 4,271,468 A | 6/1981 | Christensen et al. | 364/200 |
| 4,276,594 A | 6/1981 | Morley | 364/200 |
| 4,561,051 A | 12/1985 | Rodman et al. | 364/200 |
| 4,745,545 A | 5/1988 | Schiffleger | 364/200 |
| 4,754,398 A | 6/1988 | Pribnow | 364/200 |
| 4,796,176 A | 1/1989 | D'Amico et al. | 364/200 |

(List continued on next page.)

FOREIGN PATENT DOCUMENTS

| | | |
|---|---|---|
| EP | 0 459 714 A2 | 12/1991 |
| EP | 0 486 304 A2 | 5/1992 |
| EP | 0 511 476 A2 | 11/1992 |
| GB | 2 287 621 A | 9/1995 |

OTHER PUBLICATIONS

IBM TBD vo.38, issue 8, p. 531–534 "Grouping of Instructions".*

"Computer Architecture A Quantitative Approach," Second Edition, by David A. Patterson, University of California at Berkeley, John L. Hennessy, Stanford University, with a contribution by David Goldberg, Xerox Palo Alto Research Center, Morgan Kaufmann Publisher, Inc., San Francisco, California, pp. 694–696.

Patent Abstracts of Japan, Publication No. 08235142 A, Sep. 13, 1996.

Patent Abstracts of Japan, Publication No. 08272757 A, Oct. 18, 1996.

*Primary Examiner*—Dennis M. Butler
*Assistant Examiner*—Nitin C. Patel
(74) *Attorney, Agent, or Firm*—Jenkens & Gilchrist, P.C.

(57) ABSTRACT

A method for simultaneous start-up of a plurality of processors in a multiprocessing system is disclosed, whereby a special hardware register (e.g., "WhoAmI register") can be shared by the plurality of different processors. Alternatively, a separate WhoAmI register can be provided for one or more of the different processors. When a processor performs a read operation on a WhoAmI register, the register returns an identification number associated with that processor. Consequently, this processor can perform a set of test and jump instructions to access and execute the appropriate start-up code for this processor. Other embodiments disclosed include a method for distributing interrupts in a multiprocessing system, a method for bus arbitration in a multiprocessing system, and a method for creating atomic instructions that can be used for synchronization in a multiprocessing system.

10 Claims, 4 Drawing Sheets

U.S. PATENT DOCUMENTS

| | | | |
|---|---|---|---|
| 4,893,234 A | 1/1990 | Davidson et al. | 364/200 |
| 4,901,230 A | 2/1990 | Chen et al. | 364/200 |
| 5,043,882 A | 8/1991 | Ikeno | 364/200 |
| 5,179,707 A | 1/1993 | Piepho | 395/725 |
| 5,202,970 A | 4/1993 | Schiffleger | 395/425 |
| 5,247,637 A | 9/1993 | Leedom et al. | 395/425 |
| 5,283,904 A | 2/1994 | Carson et al. | 395/725 |
| 5,367,690 A * | 11/1994 | Schiffleger | 395/725 |
| 5,410,710 A | 4/1995 | Sarangdhar et al. | 395/725 |
| 5,423,049 A | 6/1995 | Kurihara | 395/725 |
| 5,428,783 A * | 6/1995 | Lake | 395/650 |
| 5,428,803 A | 6/1995 | Chen et al. | 395/800 |
| 5,446,910 A | 8/1995 | Kennedy et al. | 395/800 |
| 5,448,716 A * | 9/1995 | Hardell, Jr. et al. | 395/550 |
| 5,450,576 A | 9/1995 | Kennedy | 395/650 |
| 5,491,788 A | 2/1996 | Cepulis et al. | 395/182.11 |
| 5,495,615 A | 2/1996 | Nizar et al. | 395/733 |
| 5,507,032 A | 4/1996 | Kimura | 395/826 |
| 5,511,200 A | 4/1996 | Jayakumar | 395/739 |
| 5,524,209 A * | 6/1996 | Parker et al. | 714/36 |
| 5,555,420 A | 9/1996 | Sarangdhar et al. | 395/739 |
| 5,579,505 A | 11/1996 | Ohkami | 395/482 |
| 5,583,987 A | 12/1996 | Kobayashi et al. | 395/182 |
| 5,596,759 A * | 1/1997 | Miller et al. | 713/323 |
| 5,669,002 A | 9/1997 | Buch | 395/726 |
| 5,721,931 A | 2/1998 | Gephardt et al. | 395/800 |
| 5,724,527 A * | 3/1998 | Karnik et al. | 710/315 |
| 5,758,169 A | 5/1998 | Nizar et al. | 395/739 |
| 5,768,585 A * | 6/1998 | Tetrick et al. | 713/2 |
| 5,778,236 A | 7/1998 | Gephardt et al. | 395/733 |
| 5,784,630 A | 7/1998 | Saito et al. | 395/800 |
| 5,805,883 A | 9/1998 | Saitoh | 395/675 |
| 5,864,781 A * | 1/1999 | White | 702/182 |
| 5,889,983 A * | 3/1999 | Mittal et al. | 395/564 |
| 6,009,521 A * | 12/1999 | Huang | 713/1 |
| 6,112,282 A | 8/2000 | Lynch | 711/145 |
| 6,188,381 B1 * | 2/2001 | van der Wal et al. | 345/112 |
| 6,237,019 B1 * | 5/2001 | Ault et al. | 709/104 |

\* cited by examiner

100 jumpstation:

| | | | |
|---|---|---|---|
| IO-Read | R1, 0x1 | 102 | ; read the *WhoAmI* register |
| compare | R1, 0x0 | 104 | ; test if processor 0 |
| branchNotEq | cont0 | 106 | ; if not processor 0 continue |
| jump | cpu0 | 108 | ; if CPU0 jump to its code |
| nop | | | | cont0:

| | | | |
|---|---|---|---|
| compare | R1, 0x1 | 110 | ; test if processor 1 |
| branchNotEq | cont1 | 112 | ; if not processor 1 continue |
| jump | cpu1 | 114 | ; if CPU1 jump to its code |
| nop | | | | cont1:

| | | | |
|---|---|---|---|
| compare | R1, 0x2 | 116 | ; test if processor 2 |
| branchNotEq | cont2 | 118 | ; if not processor 2 continue |
| jump | cpu2 | 120 | ; if CPU2 jump to its code |
| nop | | | | cont2:

| | | | |
|---|---|---|---|
| compare | R1, 0x3 | 122 | ; test if processor 3 |
| branchNotEq | cont1 | 124 | ; if not processor 3 continue |
| jump | cpu3 | 126 | ; if CPU3 jump to its code |
| nop | | | |
| jump | jumpstation | 128 | ; something wrong. We should not |
| nop | | | ; be here. Try again. |

```
IO-Write     0x0, R1     ; writes register R1 to internal IO address 0x0
IO-Read      R1, 0x0     ; reads internal IO address 0x0 to register R1
```

FIG. 8

```
                                  ~300
WhoAmI:
     IO-Read       R1, 0x01      ; read the WhoAmI register   ~302

Try_lock:
     IO-Read       R1, 0x02      ; this is a spin-lock
     Compare       R2, R1        ; check if the semaphore0 is free and lock it if so  ~304
     BranchNotEq   Try_lock      ; compare if the locking was successful  ~306
     nop                         ; if already locked, try again!  ~308
     nop                         ; semaphore0 locked
     IO-Write      R1, 0x02      ; unlock semaphore0  ~310
                                 ; note that the data written here does not matter
```

SYSTEM AND METHOD OF START-UP IN EFFICIENT WAY FOR MULTI-PROCESSOR SYSTEMS BASED ON RETURNED IDENTIFICATION INFORMATION READ FROM PRE-DETERMINED MEMORY LOCATION

CROSS-REFERENCES TO RELATED APPLICATIONS

This Application for Patent claims the benefit of priority from, and hereby incorporates by reference the entire disclosure of, co-pending U.S. Provisional Application for Patent Serial No. 60/110,985, filed Dec. 3, 1998.

BACKGROUND OF THE INVENTION

1. Technical Field of the Invention

The present invention relates in general to the computer systems field and, in particular, to a method for increasing the efficiency of a plurality of computer processors having shared memory in a telecommunication system.

2. Description of Related Art

The existing start-up procedures used to launch multiple processors simultaneously in a multiprocessing system are typically complicated and problematic. For example, during start-up of a conventional multiprocessing system, each processor initially reads the software code located in the first memory address accessed. In a multiprocessing system with distributed memory, a processor's software code is located in a physical memory location associated with that processor. In other words, each processor's code can reside in a different address space. Consequently, at start-up, each processor has no problem with accessing its own code.

However, in a multiprocessing system with shared memory, all of the processors' software code can share the same address space or a range of multiple address spaces located in a common physical memory. Consequently, an important design goal of existing multiprocessing systems has been to enable start-up of all processors so that each processor can initially access its correct software code. A problem for multiprocessing system designers is that this design goal has been difficult and costly to achieve.

Another problem with existing multiprocessing systems is that the distribution of interrupts between processors can be uneven, which reduces a system's efficiency. For example, using one method called static interrupt distribution, each processor handles a unique interrupt or set of interrupts. One approach is to hardwire different segments of an interrupt vector to specific processors for handling. Consequently, using this method, the overall distribution of interrupts always remains the same.

The static interrupt distribution method has been implemented in multiprocessing systems in a number of ways. For example, an existing approach is to use one processor to handle all of the interrupts in the system, while the other processors are used to execute just the non-interrupt software code. An advantage of this method is that new interrupts are always distributed to a known processor. Consequently, the system can be designed with less complexity, because there is no need to account for different processors handling different interrupts. Furthermore, only one interrupt controller is needed in such a system.

Figure 1A:
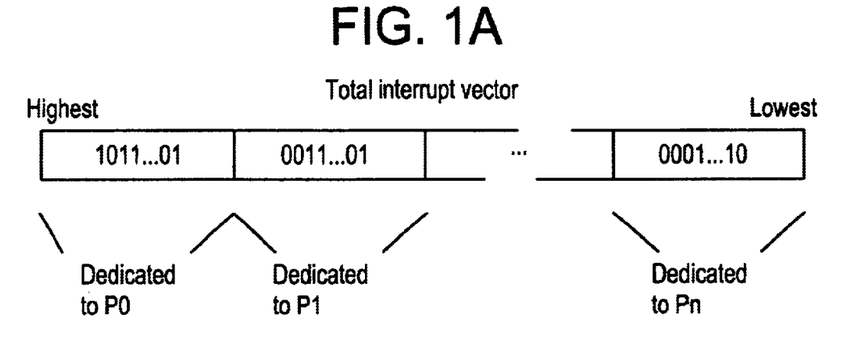
FIG. 1A is a block diagram that illustrates an existing static interrupt distribution approach used for multiprocessing systems.

Nevertheless, there is a significant disadvantage of such a static interrupt distribution approach using one processor in a multiprocessing system. The statistical distribution of the interrupts can make this one processor very busy at certain times and not so busy at others. In that regard, a more level processing load is preferred. One solution to this problem is to divide the interrupts evenly between processors. For example, as illustrated by the diagram shown in FIG. 1A, one processor (P0) can be given the "highest" segment of the interrupt vector to handle, a second processor (P1) can be given the next "highest" segment of the interrupt vector to handle, and so on to the lowest segment. However, with this approach, the interrupts are not evenly distributed, because as illustrated by FIG. 1A, an interrupt can occur while its dedicated processor is not available, and there is no provision to execute that interrupt by another processor in the meantime.

Figure 1B:
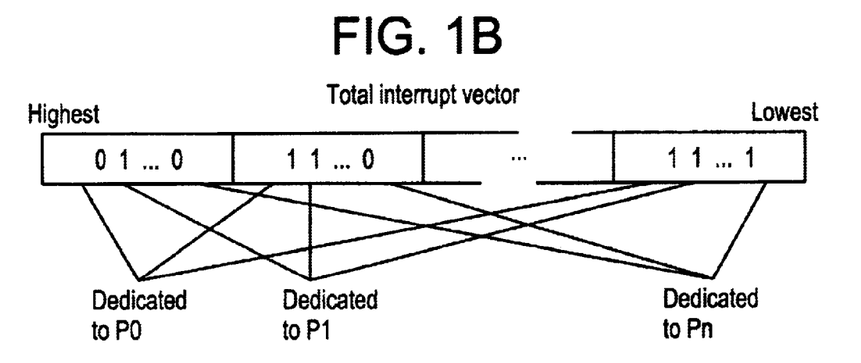
FIG. 1B is a block diagram that illustrates an existing static interrupt distribution approach used for multiprocessing systems, with an even distribution based on interrupt priorities.

An existing static interrupt distribution approach distributes the interrupts evenly in accordance with different interrupt priorities. As illustrated by the diagram shown in FIG. 1B, this interrupt priority distribution approach appears to produce a relatively even interrupt workload. However, as described above, a static interrupt distribution approach requires the development of very reliable distribution statistics, such as, for example, the amount of time it takes to handle individual interrupts and how often they are executed.

In any event, the existing static interrupt distribution approaches are relatively simple to implement, but their most significant disadvantage is that the designs are inflexible. For example, using an existing static interrupt distribution approach, if a processor's workload has changed over time for some reason (e.g., software evolution, etc.), then the interrupt hardware needs to be redesigned. However, each new design requires a study about the interrupt distribution statistics involved, which can be a time-consuming, inconvenient and complicated undertaking. Furthermore, the existing static interrupt distribution approaches introduce undesirable interrupt latencies into the systems involved. Such latency characteristics are very difficult to deal with, especially if the multiprocessing system is intended to run a realtime operating system. Consequently, as demonstrated above, a need exists for an improved method for distributing interrupts in a multiprocessing system.

A more flexible hardware interrupt distribution approach used for existing multiprocessing systems is called dynamic interrupt distribution. Using this dynamic approach, the interrupt distribution can be changed while the system is in operation. An obvious advantage of this approach is that there is no need to develop interrupt distribution statistics, because the hardware handles the interrupt distribution in realtime. Consequently, if the interrupt distribution statistics change overtime for some reason (e.g., new software development, etc.), there is no need to change the interrupt hardware or develop new distribution statistics in order to implement such a dynamic approach.

Theoretically, the use of a dynamic hardware interrupt distribution approach for a multiprocessing system is a viable alternative to the use of a static approach. Nevertheless, the existing dynamic hardware interrupt distribution approaches have significant disadvantages. For example, the hardware design for a dynamic interrupt distribution method is relatively complex, and the method itself is difficult to implement. The algorithm that controls the interrupt distribution has to be an extremely "smart" algorithm. In other words, the control logic for such an algorithm must be capable of determining which (if any) interrupts are currently being executed by each processor, and which interrupts have been queued by each processor for execution at a later time. Based on such information, an interrupt controller has to make relatively difficult decisions about where to send each new interrupt. With existing hardware interrupt distribution designs, the control units' integrated circuits require a very large number of gates and take up a large amount of silicon space as a result. Consequently, this design solution is relatively costly in terms of power consumption.

In any event, most computer systems function with a certain amount of interrupt dependency. In other words, certain interrupts must be processed in a specific order, at a specific time or specific number of times, or associated with specific memory that can be locked by a semaphore (or other hardware or software resources of any kind). This interrupt dependency complicates matters even more for static interrupt distribution approaches in which the distribution is not changed easily due to software development.

Still another problem with existing multiprocessing systems using shared resources (e.g., memory, Input/Output (I/O) areas, synchronization blocks, etc.) is that bus arbitration is used to distribute the shared resources to the different processors. As such, with existing bus arbitration methods, only one processor can use a bus at one time. However, the processors can still execute non-interrupt software code or interrupt code with different priorities. The higher priority interrupts are typically processed before the lower priority interrupts and the non-interrupt software code.

A significant problem arises with existing bus arbitration methods if the arbitration process is performed using a conventional round robin or similar scheme. For example, using a typical round robin scheme, each process is given a predetermined amount of time for execution and then swapped out. A circular First-In-First-Out (FIFO) ready queue is typically used. Using such a method, the arbitration procedure treats the processors fairly if they are not processing interrupts. If the processors are processing interrupts, the processor's priorities are not maintained because of the different interrupt priorities.

Yet another problem that arises with existing multiprocessing systems relates to the use of atomic hardware synchronization primitives. For example, when several processes are being executed by a single processor, or a typical multiprocessor design is being used, so-called atomic primitives are used as code for hardware synchronization purposes. As such, for multiple process computers or multiprocessing systems, a method for mutually excluding the different processes or processors is required. Some existing systems have implemented this exclusion method as instructions in a typical instruction set. Other existing systems have implemented this exclusion method with hardware semaphores (e.g., Atomic Exchange, Test&Set and Fetch&Increment instructions). In any event, a problem with some existing multiple process or multiprocessing systems is that not all processors are designed for mutual exclusion, and consequently, there is no relatively simple way for them to perform atomic operations. Nevertheless, as described in detail below, the present invention successfully resolves the above-described problems and other related problems.

SUMMARY OF THE INVENTION

In accordance with a preferred embodiment of the present invention, a method for simultaneous start-up of a plurality of processors in a multiprocessing system is provided whereby a special hardware register (referred to as a "WhoAmI register") can be shared by the plurality of different processors. Alternatively, a separate WhoAmI register can be provided for one or more of the different processors. When a processor performs a read operation on a WhoAmI register, the register returns an identification number associated with that processor. Consequently, this processor can perform a set of test and jump instructions to access and execute the appropriate code for this processor.

In accordance with a second embodiment of the present invention, a method for distributing interrupts between a plurality of processors in a multiprocessing system is provided, whereby each processor can access a complete interrupt vector. The interrupt vector is masked, and a different mask is provided for each processor (e.g., using special mask registers). Consequently, all of the interrupts used can be coupled to and handled by all of the processors.

In accordance with a third embodiment of the present invention, a method for bus arbitration in a multiprocessing system is provided, whereby the arbitration procedure is based on the priority of the interrupt currently being executed by each processor. A processor that executes an interrupt having the highest priority is granted all of the bus operations that processor needs in order to run at full speed. If that processor is not using the bus at a particular time, then another processor may be allowed to use the bus. However, if two or more processors attempt to execute interrupts having the same priority, or all of the processors attempt to execute non-interrupt software code, then a round-robin scheme can be used to control the bus arbitration. In this way, the system priorities for the executed code can be preserved, and the overall performance of the system will be improved.

In accordance with a fourth embodiment of the present invention, a method for synchronizing a plurality of processors in a multiprocessing system is provided, whereby atomic hardware semaphores can be implemented for synchronization purposes using processor I/O bus (operations) or coprocessor bus (operations) For this embodiment, sequences of atomic instructions can be created for execution within a single processor clock cycle using processor I/O operations and, for example, a serialization or arbitration unit. In order for a processor to take a hardware semaphore, the processor performs an I/O-Read instruction to access the location of the desired semaphore in a semaphore register. A serialization or arbitration unit associated with the semaphore register responds to that Read operation with information about whether or not that semaphore is "locked" and has already been taken by another processor. If the semaphore has already been taken by another processor, then the response to that Read operation reports that the requesting processor has failed to take the semaphore. In this way, a processor's I/O-Read instruction is used to read and write from/to a semaphore register within one clock cycle, which creates an atomic instruction that can be used for synchronization purposes.

An important technical advantage of the present invention is that a method for simultaneous start-up of a plurality of processors in a multiprocessing system is provided that enables efficient use of shared memory in relatively small on-chip multiprocessors.

Another important technical advantage of the present invention is that a relatively simple and flexible method is provided which can be used for efficiently distributing interrupts (statically or dynamically) between a plurality of processors in a multiprocessing system.

Still another important technical advantage of the present invention is that a method for bus arbitration in a multiprocessing system is provided which preserves system priorities for executed code, minimizes arbitration contention problems, and improves overall system performance.

Yet another important technical advantage of the present invention is that a relatively simple method for creating atomic operations for a plurality of processors in a multi-processing system is provided, which can be used for synchronization purposes.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–8 of the drawings, like numerals being used for like and corresponding parts of the various drawings.

Essentially, in accordance with a preferred embodiment of the present invention, a method for simultaneous start-up of a plurality of processors in a multiprocessing system is provided whereby a special hardware register (referred to as a "WhoAmI register") can be shared by the plurality of different processors. Alternatively, a separate WhoAmI register can be provided for one or more of the different processors. When a processor performs a read operation on a WhoAmI register, the register returns an identification number associated with that processor. The WhoAmI register can be accessed directly by a processor's I/O device or a coprocessor bus, or mapped into a shared memory location and accessed with a conventional memory access operation.

For this embodiment, the address used to access a WhoAmI register is the same for all processors in the multiprocessing system. However, if one WhoAmI register is used for each processor, and the WhoAmI register s virtual address is the same for all processors, different physical registers should be used. At start-up, all processors in the multiprocessing system execute the same code read in the WhoAmI register. The read operation returns an identification number associated with the processor that performed the operation, and a test and jump instruction that can guide that processor to the location of the correct executable code.

Figure 2:
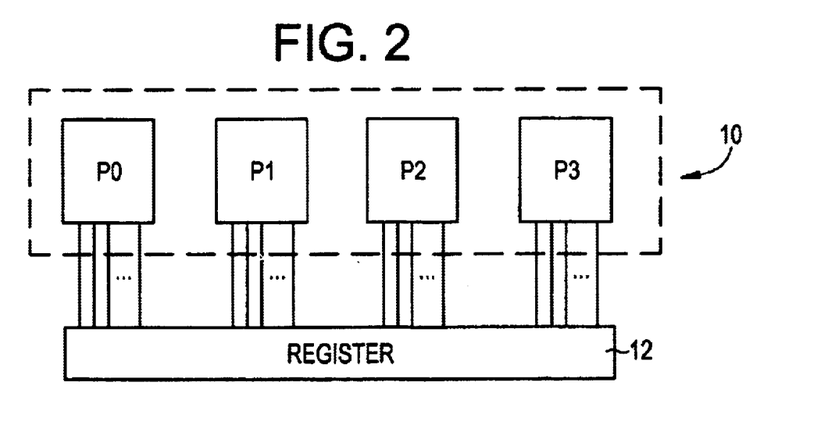
FIG. 2 is a block diagram of an exemplary four-processor multiprocessing system, which can be implemented in accordance with the preferred embodiment of the present invention.

Specifically, FIG. 2 is a block diagram of an exemplary four-processor multiprocessing system 10, which can be implemented in accordance with the preferred embodiment of the present invention. During the start-up procedure for multiprocessing system 10, each processor in the system performs an I/O-Read instruction to access a WhoAmI register (12). For this embodiment, only one WhoAmI register is used, but the present invention is not intended to be limited to the use of only one such register. In response to the I/O-Read request from a processor, the WhoAmI register 12 returns an identification number associated with that processor. For example, in multiprocessing system 10 with four central processors, if processor P0 performs an I/O-Read operation to read the contents of the WhoAmI register, the register can return the code sequence 0×0. If processor P1 also "reads" the WhoAmI register 12, the register can return the sequence 0×1, and so on for processors P2 (0×2) and P3 (0×3). For this embodiment, the WhoAmI register is preferably a read-only register.

Figure 3:
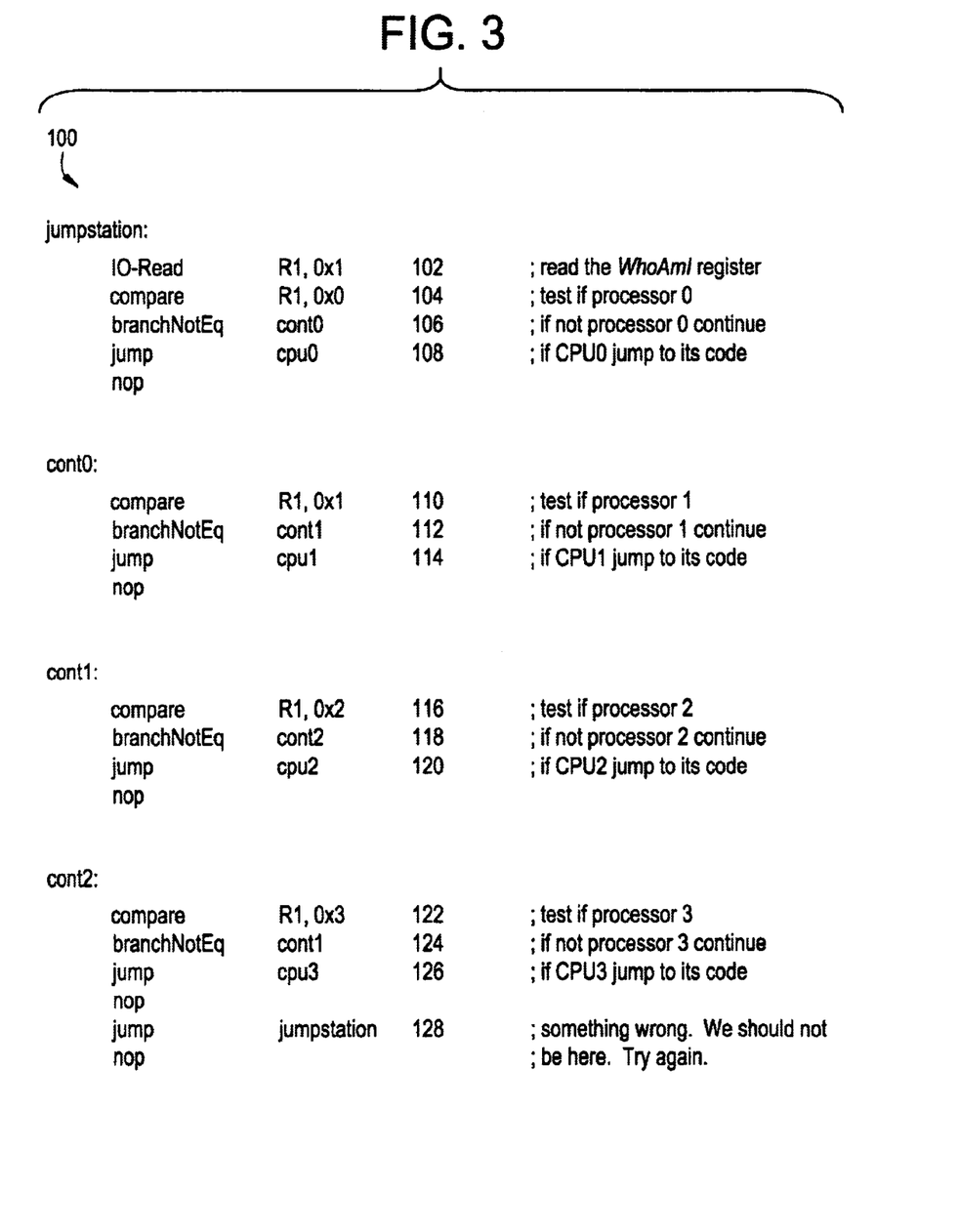
FIG. 3 is a diagram of exemplary software code instructions that can be used with a WhoAmI register to start-up a plurality of processors, in accordance with the preferred embodiment of the present invention.

A method for using a WhoAmI register to start-up a plurality of processors in accordance with the preferred embodiment is illustrated by the exemplary software code shown in FIG. 3. Essentially, a code sequence of software instructions 100 (referred to herein as a "jumpstation") can be used. At the first instruction (102) of the Jumpstation, a processor (e.g., P0) performs a read operation (e.g., I/O-Read) to access a WhoAmI register (12). At instruction 104, that processor performs a comparison operation to determine whether or not the information retrieved during the read operation includes an identification number associated with that processor (e.g., 0×0). If not, then at instruction 106, that processor performs a branch operation to the next instruction (110). However, if the information retrieved from the read operation (102) includes an identification number associated with that processor, then at instruction 108, that processor performs a jump operation to a memory location which contains the correct start-up code to be executed by that processor.

Returning to instruction 106, if the information retrieved from instruction 102 does not contain the appropriate identification number for that processor (P0), then at instruction 110, a second processor (e.g., P1) performs a compare operation to determine whether or not the information retrieved during the initial read operation (102) includes an identification number associated with that processor (e.g., 0×1). If not, then at step 112, that processor performs a branch operation to the next instruction code (116). However, if the information retrieved during the read operation (102) includes the identification number associated with that processor (0×1), then at instruction 114, that processor performs a jump operation to the memory location which contains the correct start-up code to be executed by that processor.

Returning to instruction 112, if the information retrieved at step 102 does not contain that processor's identification number (0×1), then at instruction 116, a third processor (e.g., P2) performs a compare operation to determine whether or not the information obtained during the read operation (102) includes that processor's identification number (e.g., 0×2). If not, then at instruction 118, that processor performs a branch operation to the next instruction (step 122). However, if the information obtained during the read operation (102) includes that processor's identification number (0×2), then at instruction 120, that processor performs a jump operation to the memory location which contains the correct start-up code to be executed by that processor (P2).

Returning to instruction 118, if the information obtained during the read instruction 102 does not contain the reading processor's identification number (0×2), then at instruction 122, a fourth processor (e.g., P3) performs a compare operation to determine whether or not the information obtained during the read operation (102) includes that processor's identification number (e.g., 0×3). If not, then at instruction 124, that processor (P3) performs a branch operation to the next instruction (128). However, if the information obtained during the read operation (102) includes that processor's identification number (0×3), then at instruction 126, that processor performs a jump operation to the memory location that contains the correct start-up code to be executed by that processor (P3). If a processor reaches instruction 128, it can be assumed that the read operation (102) was erroneous, and the method can be restarted at instruction 102 if so desired.

In accordance with a second embodiment of the present invention, a method for distributing interrupts between a plurality of processors in a multiprocessing system is provided, whereby each processor can access the complete interrupt vector. The interrupt vector is masked, and a different mask is provided for each processor (using special mask registers). Consequently, all of the interrupts used can be coupled to all of the processors (by the special mask registers).

For this embodiment, each processor is associated with a respective mask register, and each mask register includes one bit associated with each interrupt to be used in the system. If a specific interrupt bit is set in a mask register, then the processor associated with that mask register can handle that interrupt. However, if the bit for that interrupt is cleared (not set), then that interrupt will not be available to that processor. In this manner, the distribution of interrupts in a multiprocessing system can be controlled from the mask registers, and a processor can perform conventional I/O operations to read or write bit information from or to a mask register. Alternatively, and also in accordance with the present invention, a mask register can exist (virtually) as a mapping to a system memory location, and a conventional memory access operation can be performed to read or write bit information from or to the memory "mask register". As such, these read/write operations can be performed by high-level software, and consequently, both a conventional static or dynamic interrupt distribution process can be controlled by this high-level software. This method can be referred to as software controlled interrupt distribution.

Specifically, in accordance with the second embodiment, there are at least two methods that can be used to implement the present invention's software controlled interrupt distribution in a multiprocessing system. Using one method, the interrupts can be distributed to each processor in the processors' start-up code and not changed thereafter. With this approach, the advantages associated with a static distribution method can be realized, but the software can still be used to change the distribution as needed (at least at start-up). As such, this method is relatively flexible and readily adaptable for future software development.

Figure 4:
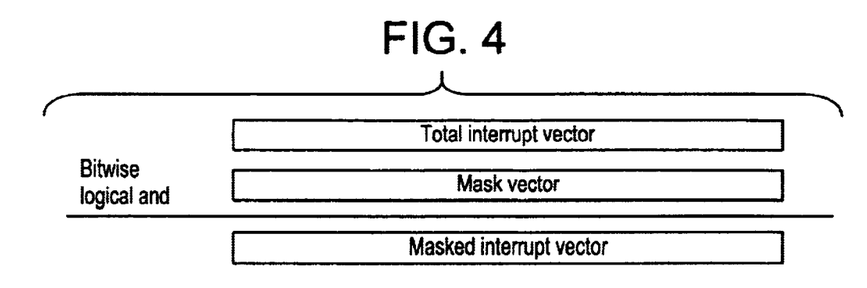
FIG. 4 is a diagram that illustrates masking of an interrupt vector so as to enable any processor in a multiprocessing system to gain access to an entire interrupt vector, in accordance with a second embodiment of the present invention.

A second method that can be used to implement software controlled interrupt distribution in a multiprocessing system is to allow the distribution to be changed during operations. For example, as illustrated by the diagram shown in FIG. 4, any processor in the system can gain access to the total interrupt vector. As shown, the interrupt vector is masked, and one mask is provided for each processor. Consequently, using conventional I/O registers, any processor in the system can program the masks with predefined interrupt bit patterns at any time during system operation. Also, each processor can use a conventional interrupt controller to implement this method.

Specifically, an appropriate statistical distribution of interrupts can be implemented in the system by software. As such, each interrupt can be distributed to each processor in accordance with a predetermined distribution table (e.g., maintained in a system database). A selected distribution pattern of interrupt bits can be set in the start-up code for each processor (and associated mask register) and not changed thereafter. Alternatively, the software can be used to change the distribution of interrupt bits for the mask registers while the system is in operation.

In accordance with a third embodiment of the present invention, a method for bus arbitration in a multiprocessing system is provided, whereby the arbitration procedure is based on the priority of the interrupt currently being executed by each processor. A processor that executes an interrupt having the highest priority is granted all of the bus operations that processor needs in order to run at full speed. If that processor is not using the bus at a particular time, then another processor may be allowed to use the bus. However, if two or more processors attempt to execute interrupts having the same priority, or all of the processors attempt to execute non-interrupt software code, then a round-robin scheme can be used to control the bus arbitration. In this way, the system priorities for the executed code can be preserved, and the overall performance of the system will be improved.

Figure 5:
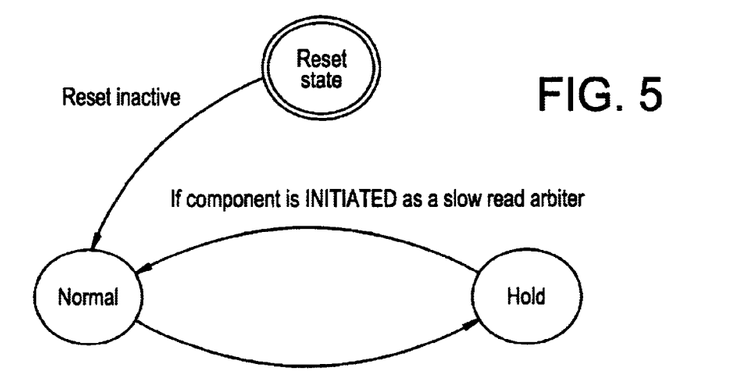
FIG. 5 is a state diagram that can be used to illustrate a third embodiment of the present invention.

Specifically, FIG. 5 is a state diagram that can be used to illustrate the third embodiment of the present invention. For this embodiment, because arbitration is typically required for all buses in such a system, the multiplexing function is preferably separated from the selection function. Consequently, one selection block design can be used anywhere a selection block is required. As such, this embodiment can be considered a type of centralized, parallel arbitration scheme.

In accordance with the third embodiment, bus arbitration is performed for two different cases. For example, in one case, one or more processors which have requested access to a bus are executing interrupt code. In this case, the processor which is executing the highest priority interrupt is granted access to the bus. In the second case, a processor which has requested the bus is executing non-interrupt software code. In this case, a round robin scheme can be used to grant access to the bus. Consequently, the next processor nearby the processor most recently granted access, is now granted access to the bus.

Figure 6:
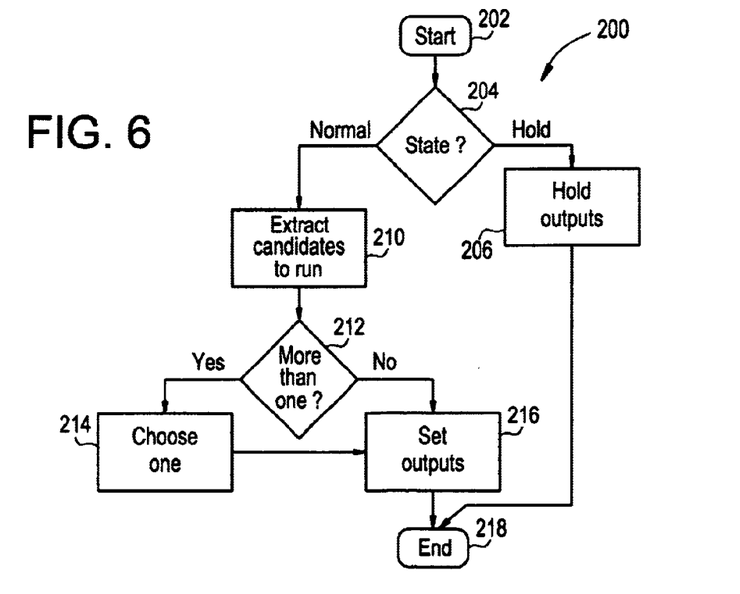
FIG. 6 is a flow diagram of an exemplary bus arbitration method that can implemented in accordance with the third embodiment of the present invention.

FIG. 6 is a flow diagram of an exemplary bus arbitration method (200) that can implemented in accordance with the third embodiment of the present invention. Preferably, one arbitration request signal is used for each processor in the system. Preferably, one arbitration request signal is used for each processor in the system a processor can be stopped by using the processor's wait, stop, sleep or hold function. As such, this method can be used to decrease power consumption in the system.

Referring to FIGS. 5 and 6, a state machine having two states (e.g., Normal, Hold) is used. As such, the two states shown can be used to handle the two-cycle read function of certain buses. At step 204, if such a state machine is initialized to use a two-cycle read function, then the next state to be entered is the "Hold" state. Otherwise, the "Normal" state is entered. As shown, during the "Normal" state, most of the arbitration tasks are performed. At step 210, the candidate interrupt bits to be executed are extracted from the interrupt vector.

At step 212, an arbiter makes a determination about whether or not more than one interrupt has been received. If so, at step 214, an interrupt is selected for execution. At step 216, the processor output(s) (i.e., data and address buses) associated with that interrupt is/are set to the proper value(s). However, at step 212, if only one or no interrupt requests have been received, then a round robin scheme can be used to select which processor will execute the interrupt(s). At step 216, the processor outputs are set to their proper values.

Returning to step 204, if the state machine is in the "Hold" state, at step 206, the processor which had gained access to the bus during the last cycle, is allowed to have access during this cycle too. All of the processor outputs are held in their present condition.

In accordance with a fourth embodiment of the present invention, a method for synchronizing a plurality of processors in a multiprocessing system is provided, whereby atomic hardware semaphores can be implemented for synchronization purposes using processor I/O operations or coprocessor bus operations. As such, the I/O operations (or coprocessor bus operations) for most processors require one clock cycle to complete. For this embodiment, sequences of atomic instructions can be created for execution within a single clock cycle using processor I/O operations (or coprocessor bus operations) and, for example, a serialization or arbitration unit. In order for a processor to take a hardware semaphore, the processor performs an I/O-Read instruction (or coprocessor bus Read instruction) to access an address corresponding to the location of the desired semaphore in a semaphore register. A serialization or arbitration unit associated with the semaphore register responds with information about whether or not that semaphore is "locked" and has already been taken (e.g., by another processor). For example, if that semaphore is free (unlocked), it is "taken" (and locked) by the requesting processor, and a successful "take" operation is reported back to that processor in response to the same read instruction. However, if the semaphore has already been taken (locked) by another processor, then the response to that read instruction reports that the requesting processor has failed to take the semaphore.

Figure 7:
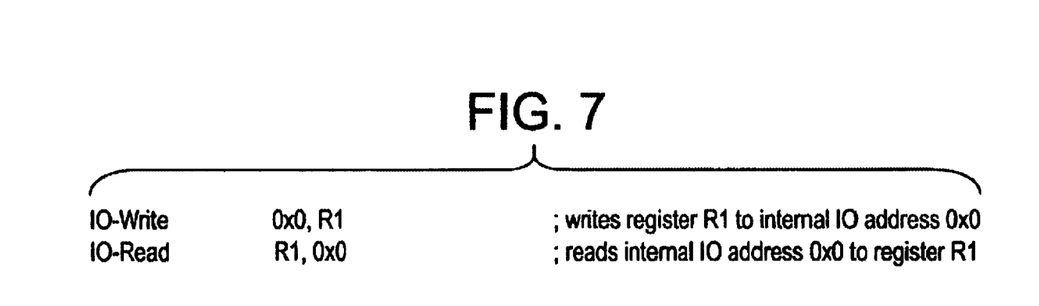
FIG. 7 is a diagram of exemplary software coding that can be used with processor I/O-Read and I/O-Write instructions or coprocessor Read and Write instructions, in order to create atomic operations for synchronizing processors in a multiprocessing system, in accordance with a fourth embodiment of the present invention.

In order to clear a semaphore (unlock it or free it up for taking), an I/O-Write instruction (or coprocessor bus Write instruction) is performed on the semaphore register. Preferably, for this embodiment, all accesses to the semaphore register are serialized or arbitrated, for atomic operations. Specifically, in order to access a processor's internal I/O area, an in and "out" instruction in that processor's I/O instruction set can be used. The "out" instruction writes a register's contents (e.g., semaphore register's contents) to a specific I/O address. The "in" instruction reads the I/O device's address or location to the register (e.g., semaphore register). By using such "in" and "out" I/O instructions, a processor can access all internal I/O addresses (including those associated with a semaphore register) within one clock cycle and thus create atomic instructions for synchronization (or similar) operations. FIG. 7 is a diagram of exemplary coding that can be used with processor I/O-Read and I/O-Write instructions or coprocessor Read and Write instructions, in order to create atomic operations for synchronizing processors in a multiprocessing system, in accordance with the fourth embodiment of the present invention.

As mentioned earlier, parallel processor designs typically require some type of synchronization primitives implemented in hardware to support the higher synchronization levels. An operation that controls the synchronization registers should not require more than one clock cycle to-complete, or the atomic operations will be difficult to implement. In accordance with the fourth embodiment described directly above, four hardware semaphores can be used to provide four different levels of protection. However, the present invention is not intended to be limited to a specific number of semaphores and more (or less) semaphores and/or processors can be used. For this embodiment, semaphore registers are used which can be, for example, 8 bits wide.

Figure 8:
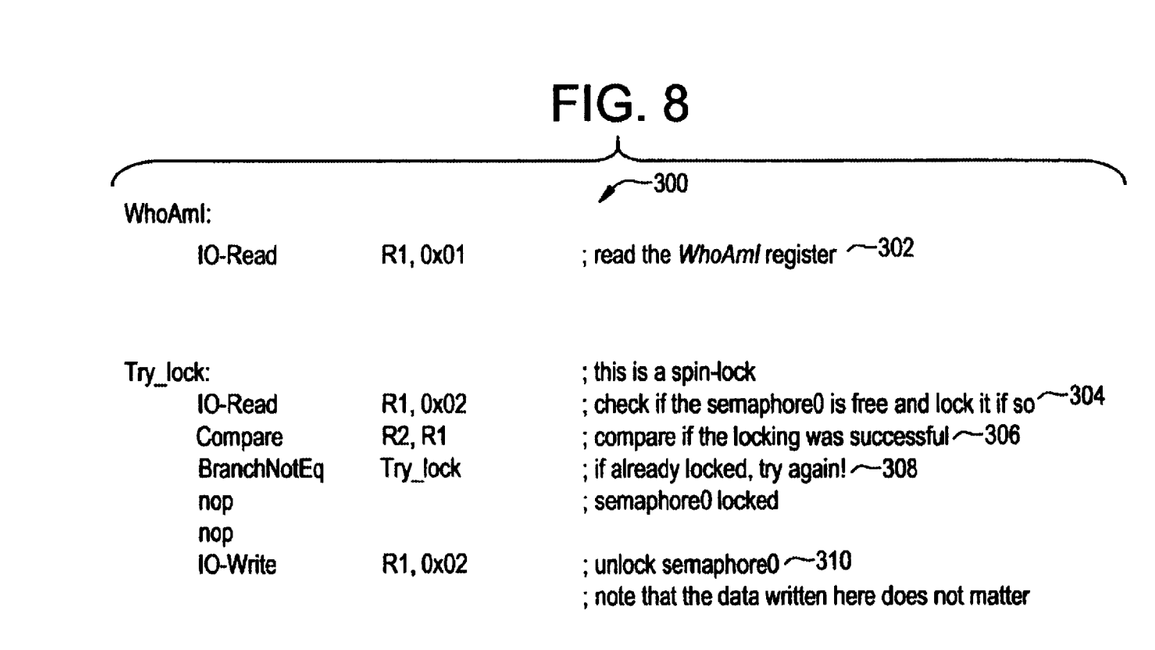
FIG. 8 is a diagram of exemplary software code that illustrates in more detail how a processor can implement I/O-Read and I/O-write instructions to lock and/or unlock a semaphore, in accordance with the fourth embodiment of the present invention.

In this regard, FIG. 8 is a diagram that shows more clearly how a processor can implement I/O-Read and I/O-write instructions to lock (take) and/or unlock (release) a semaphore, in accordance with the fourth embodiment of the present invention. In operation, when a processor takes the semaphore (locks it), the semaphore register contains the number of the processor that has locked that semaphore. If that lock is released by a processor (preferably the processor which locked that semaphore), this function is indicated by setting a certain value (e.g., 255) in the semaphore register associated with that semaphore.

Referring to instruction 302 in FIG. 8, when a processor attempts to lock a semaphore, that processor performs an I/O-Read instruction at the address corresponding to the semaphore to be locked. For this embodiment, a WhoAmI register can be used for a semaphore register. If that semaphore is already locked (as an example, assume that the value "255" is in the register), the semaphore register contains an identification number associated with the processor that had the performed the lock operation. The I/O-Read instruction returns the contents of the semaphore register (e.g., "0" if P0 is the locking processor) to the requesting processor (instruction 308), which can thus determine that the semaphore- has already been taken (and locked) and by what processor.

If the lock has been released (unlocked) by the second processor and that semaphore is free (instruction 304), then the returned contents from the semaphore register contain an appropriate value (e.g., "255" for a released semaphore). The same I/O-Read instruction is then used for writing the first processor's identification number in the semaphore register (e.g., "0" for P0). At instruction 310, a processor can use an I/O-Write instruction to unlock a semaphore. The important point to be made here is that, in accordance with the present invention, one I/O-Read instruction performed by a processor can both read and write atomic information from/to a semaphore register within one processor clock cycle.

For this embodiment, the use of a processor's synchronization I/O area is preferably arbitrated or serialized. Consequently, only one processor is allowed to use the synchronization primitives for I/O-Read or I/O-Write operations at any one time. However, this method is not intended to be a limitation on the invention, and non-arbitration or parallel access methods can be used. In summary, as described above, a processor I/O-Read instruction for accessing a semaphore register can be used to determine the contents of the semaphore register, and if a semaphore is free, also write semaphore lock information to the register. This use of such I/O-Read instructions for semaphores has essentially created atomic instructions. If the lock was free and then taken by a processor, that same I/O-Read instruction can be used to write to the semaphore register the number of this processor that has now locked the semaphore.

In order to release a lock on a semaphore, a processor can perform an I/O-Write instruction to the address corresponding to the semaphore to be released. For this embodiment, it is preferred that only the processor that obtained the lock is allowed to release it. However, this is not intended as a limitation on the invention, and in a different embodiment and under certain circumstances, more than one processor may be allowed to release such a lock.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for start-up of at least one processor in a multiprocessing system, comprising the steps of:

during a start-up interval, a first processor of said at least one processor performing a first read operation to a predetermined address associated with an identification memory space;

said first processor determining whether information retrieved during said first read operation includes identification information associated with said first processor;

if said information retrieved during said first read operation includes identification information associated with said first processor, said first processor performing a sequence of test and jump instructions associated with said retrieved identification information; and responsive to said step of performing said sequence of test and jump instructions, said first processor executing at least one start-up instruction;

if said information retrieved during said first read operation does not include identification information associated with said first processor, a second processor of said at least one processor determining whether the information retrieved during the first read operation includes identification information associated with the second processor; and wherein said predetermined address associated with said identification memory space for performing said first read operation is the same for said first and second processors.

2. The method of claim 1, wherein said identification memory space comprises a WhoAmI register.

3. The method of claim 1, wherein said identification memory space comprises a shared memory location in said multiprocessing system.

4. The method of claim 1, wherein said identification information is accessed by a processor I/O instruction.

5. The method of claim 1, wherein said identification information is accessed by a coprocessor bus instruction.

6. The method of claim 1, wherein said identification memory space comprises a plurality of physical registers.

7. A microprocessing system, comprising:

at least one processor;

an identification memory space, wherein a first processor of said at least one processor is operable to:

during a start-up interval, perform a first read operation to a predetermined address associated with said identification memory space;

said first processor determining whether information retrieved during said first read operation from said identification memory space includes identification information associated with said first processor;

if said information retrieved during said first read operation includes identification information associated with said first processor, said first processor performing a sequence of test and jump instructions associated with said retrieved identification information; and executing at least one start-up instruction; and if said information retrieved during said first read operation does not include identification information associated with said first processor, a second processor of said at least one processor determining whether the information retrieved during the first read operation includes identification information associated with the second processor; and wherein said predetermined address associated with said identification memory space for performing said first read operation is the same for said first and second processors.

8. The multiprocessing system of claim 7, wherein said identification memory space comprises a WhoAmI register.

9. The multiprocessing system of claim 7, wherein said identification memory space comprises a shared memory location in said multiprocessing system.

10. The multiprocessing system of claim 7, wherein said identification memory space comprises a plurality of physical registers.

* * * * *

UNITED STATES PATENT AND TRADEMARK OFFICE
CERTIFICATE OF CORRECTION

PATENT NO.    : 6,701,429 B1
DATED         : March 2, 2004
INVENTOR(S)   : Peter Gustafsson et al.

It is certified that error appears in the above-identified patent and that said Letters Patent is hereby corrected as shown below:

Column 2,
Line 49, replace "overtime" with -- over time --

Column 4,
Line 34, replace "(operations)" with -- (operations). --

Column 6,
Line 6, replace "WhoAmI register s" with -- WhoAmI register's --

Column 8,
Line 67, replace "system a processor" with -- system. A processor --

Column 10,
Line 15, replace "to-complete," with -- to complete, --
Line 48, replace "semaphone-has" with -- semaphore has --

Column 11,
Lines 21-22, replace "the. accompanying" with -- the accompanying --

Signed and Sealed this

Twenty-seventh Day of July, 2004

JON W. DUDAS
*Acting Director of the United States Patent and Trademark Office*